| United States Patent [19] | [11] Patent Number: 5,074,978 |
| Debroy et al. | [45] Date of Patent: Dec. 24, 1991 |

[54] HYDROXY TERMINATED POLYESTER ADDITIVE IN CATHODIC ELECTROCOAT COMPOSITIONS

[75] Inventors: Tapan K. Debroy, Utica; Ding Y. Chung, Rochester Hills; Craig R. Deschner, Southfield, all of Mich.

[73] Assignee: E. I. du Pont de Nemours and Company, Wilmington, Del.

[21] Appl. No.: 483,837

[22] Filed: Feb. 23, 1990

[51] Int. Cl.$^5$ .............................................. C25D 13/10
[52] U.S. Cl. ................................ 204/181.7; 204/181.4
[58] Field of Search ............................ 204/181.7, 181.4

[56] References Cited

U.S. PATENT DOCUMENTS

| 3,784,501 | 1/1974 | Pettit, Jr. | 260/31.6 |
| 3,846,368 | 11/1974 | Pettit, Jr. | 260/39 R |
| 3,925,574 | 12/1975 | Shor et al. | 427/195 |
| 3,972,962 | 8/1976 | Williams et al. | 260/873 |
| 4,023,977 | 5/1977 | Mercurio et al. | 106/178 |
| 4,137,277 | 1/1979 | Nordstrom et al. | 260/835 |
| 4,355,154 | 10/1982 | Saam et al. | 528/274 |
| 4,487,674 | 12/1984 | Jan Al et al. | 204/181.7 |
| 4,670,490 | 6/1987 | Yoshida et al. | 524/115 |
| 4,857,567 | 8/1989 | Laugal et al. | 204/181.7 |

*Primary Examiner*—John Niebling
*Assistant Examiner*—Kishor Mayekar
*Attorney, Agent, or Firm*—Hilmark Fricke

[57] ABSTRACT

What is disclosed are electrodepositable cationic baths containing low molecular weight hydroxyl terminated polyester adhesion promotion additives. These low molecular weight hydroxyl terminated polyesters have been found to improve chip resistance, adhesion and film build.

6 Claims, No Drawings

HYDROXY TERMINATED POLYESTER ADDITIVE IN CATHODIC ELECTROCOAT COMPOSITIONS

TECHNICAL FIELD

The field of art to which this invention pertains is electrodepositable cationic baths containing low molecular weight hydroxyl terminated polyester adhesion promotion additives. These low molecular weight hydroxyl terminated polyesters have been found to improve chip resistance, adhesion and film build.

BACKGROUND

The coating of electrically conductive substrates by electrodeposition is a well known and important industrial process. (For instance, electrodeposition is widely used in the automotive industry to apply primers to automotive substrates). In this process, a conductive article is immersed as one electrode in a coating composition made from an aqueous emulsion of film-forming polymer. An electric current is passed between the article and a counter-electrode in electrical contact with the aqueous emulsion, until a desired coating is produced on the article. The article to be coated is the cathode in the electrical circuit with the counter-electrode being the anode.

Resin compositions used in cathodic electrodeposition baths are also well known in the art. These resins are typically manufactured from polyepoxide resins which have been chain extended and adducted to include a nitrogen. The nitrogen is typically introduced through reaction with an amine compound. Typically these resins are blended with a crosslinking agent and then neutralized with an acid.

The principal emulsion is combined with a pigment paste, coalescent solvents, water, and other additives (usually at the coating site) to form the electrodeposition bath. The electrodeposition bath is placed in an insulated tank containing the anode. The article to be coated is made the cathode and is passed through the tank containing the electrodeposition bath. The thickness of the coating is a function of the bath characteristics, the electrical operating characteristics, the immersion time, and so forth.

The coated object is removed from the bath after a set amount of time. The object is rinsed with deionized water and the coating is cured typically in an oven at sufficient temperature to produce crosslinking. It is then typically covered with any of a variety of different topcoat systems (e.g. basecoat/clearcoat).

The prior art of cathodic electrodepositable resin compositions, coating baths, and cathodic electrodeposition processes are disclosed in U.S. Pat. Nos. 3,922,253; 4,419,467; 4,137,140; and 4,468,307.

Additives are a very important part of an electrocoat primer composition. Numerous different types of additives can be added. For instance film build additives are sometimes used to increase film build. High film build is important to maintain equivalent corrosion resistance without the use of a primer surfacer over the electrocoat. Generally solvents are also needed to maintain film build in the electrocoat system when using additives. Unfortunately the addition of solvents can result in higher than satisfactory volatile organic content (VOC). Another potential problem with many additives is that they can retard curing which can have an adverse effect on chip resistance (i.e. the adhesion of the electrocoat primer to the substrate) and intercoat adhesion (i.e. the adhesion of a topcoat to the electrocoat primer) This detrimental effect on the curing (and resultant poor chip resistance and intercoat adhesion) is especially pronounced at underbake conditions. Underbake is the lower limit of the cure temperature range of a given system. Underbake in current commerical cathodic electrocoat systems is about 20° F. to 30° F. lower than the standard bake temperature, for the same bake time. Underbake performance is important because some parts of the substrate being baked may not reach the optimum bake temperature.

What is needed is an additive which will promote chip resistance and intercoat adhesion, help lower VOC and improve film build.

SUMMARY OF THE INVENTION

It has been discovered that by using a low molecular weight hydroxyl terminated polyester as an adhesion promotion additive that cathodic electrocoat systems can be obtained which have better chip resistance and intercoat adhesion and surprisingly higher film build. The system has also been found to help minimize VOC for a given film build. This improved chip resistance and intercoat adhesion is especially pronounced at underbake conditions. These low molecular weight hydroxyl terminated polyester adhesion promoters have the following formula:

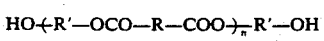

here R is alkyl, aryl or a mixture thereof; R' is alkyl, aryl or a mixture thereof; and n is a number from 1 to 6. The molecular weight of the hydroxyl terminated polyester should be between about 200 to 1000.

Previously most of the additives for cathodic electrocoat have been polyethers and not polyesters. We are aware of no other use of low molecular weight hydroxyl terminated polyesters as an additive (of any type) in cathodic electrocoat This is because polyethers were believed to have better water solubility and hydrolytic stability. However polyethers also typically retard the cure of cathodic electrocoat systems.

DETAILED DESCRIPTION OF THE INVENTION

Our invention relates to the use of low molecular weight hydroxyl terminated polyesters as an adhesion promotion additive for cathodic electrocoat. These adhesion promotion additives have been found to give not only better chip resistance and intercoat adhesion but surprisingly higher film build. This improvement in chip resistance and intercoat adhesion is especially pronounced at underbake conditions.

As previously mentioned, it is well known that most principal emulsions in cathodic electrodeposition baths have a binder resin which is an epoxy amine adduct blended with a cross-linking agent and neutralized with an acid in order to get a water soluble product. The low molecular weight hydroxy terminated polyester additives are potentially usable with a variety of different cathodic electrocoat binder resins, but the preferred binder resin is the typical epoxy amine adduct of the prior art. These resins are disclosed in U.S. Pat. No. 4,419,467 which is incorporated herein by reference.

Likewise the preferred crosslinkers for the above-mentioned binder resins are also well known in the prior art. They are aliphatic and aromatic isocyanates such as hexamethylene diisocyanate, toluene diisocyanate, methylene diphenyl diisocyanate and so forth. These isocyanates are pre-reacted with a blocking agent such as oximes, alcohols and caprolactams which block the isocyanate functionality (i.e. the crosslinking functionality). Upon heating, the oximes, alcohols, or caprolactam deblock generating free isocyanate which in turn reacts with the hydroxy functionality of the backbone resin. These crosslinking agents are also disclosed in U.S. Pat. No. 4,419,467. The neutralization of the epoxy-amine resin with an acid to attain its cationic character is likewise well known in the art. The resulting binder (or back-bone) resin is combined with pigment paste, deionized water and additives (e.g. flexibilizing agents, film build additives, flow additives and so forth) to form the electrocoat paint bath.

The cationic resin and the blocked isocyanate are the principal resinous ingredients in the principal emulsion and are usually present in amounts of about 30 to 50 percent by weight of solids.

Besides the resinous ingredients described above, the electrocoating compositions of the invention contain a pigment which is incorporated into the composition in the form of a paste. The pigment paste is prepared by grinding pigments into the pigment dispersant along with optional additives such as wetting agents, surfactants, and defoamers. Pigment dispersants (grind resins) are well known in the art. After grinding, the particle size of the pigment should be as small as practical, generally, a Hegman grinding gauge of about 6 to 8 is usually employed.

Pigments which can be employed in the practice of our invention include titanium dioxide, basic lead silicate, strontium chromate, carbon black, iron oxide, clay and so forth. These are the pigments typically used in automotive primers.

The pigment to binder ratio in the pigment paste is about 1:1 to 5:1, and preferably 2.5:1 to 5:1.

The pigment-to-resin weight ratio in the electrocoat paint bath is very important and should be preferably less than 50:100, more preferably less than 40:100, and usually about 20 to 30:100. Higher pigment-to-resin solids weight ratios have also been found to adversely affect coalescence and flow.

The cathodic electrocoat compositions of the prior art typically contained a number of different additives such as wetting agents, surfactants, defoamers and so forth. Examples of surfactants and wetting agents include alkyl imidazolines such as those available from Ciba-Geigy Industrial Chemicals as Amine C ®, acetylenic alcohols available from Air Products and Chemicals as Surfynol 104 A ®. These optional ingredients, when present in the prior art cathodic electrocoat compositions typically constituted from about 0.1 to 20 percent by weight of resin solids.

Film build additives have also been used in the prior art cathodic electrocoat compositions. High film build is important to maintain equivalent corrosion resistance without the use of a primer surfacer over the electrocoat. These prior art film build additives were normally polyethers such as ethylene or propylene oxide adducts of nonyl phenols or bisphenol A which were usually used at levels from about 0.1 to 15 percent weight resin solids. These polyether film build additives have a detrimental effect on chip resistance and intercoat adhesion.

As discussed above, it has been discovered that by using a low molecular weight hydroxyl terminated polyester adhesion promoter as an additive that cathodic electrocoat systems can be obtained which have better chip resistance, intercoat adhesion and surprisingly higher film build. These low molecular weight hydroxyl terminated polyester adhesion promoters are used at 0.1-15% by weight resin solids in the emulsion, preferably 1.0-10.0% by weight resin solids in the emulsion, and most preferably 1.5-7.0% by weight resin solids in the emulsion. The low molecular weight hydroxyl terminated polyester adhesion promoter can be used as a substitute for the film build additives of the prior art or as a supplemental additive.

These low molecular weight hydroxyl terminated polyester adhesion promoters have the following formula:

where R is alkyl, aryl or a mixture thereof; R' is alkyl, aryl or a mixture thereof; and n is a number from 1 to 6. The molecular weight of the hydroxyl terminated polyester should be between about 200 to 1000.

These low molecular weight hydroxyl terminated polyesters are the reaction product of dibasic acids and polyols. Manufacture of low molecular weight hydroxyl terminated polyester compounds is an esterification process very well known in the art. The dibasic acid can be adipic acid, fumaric acid, phthalic anhydride, isophthalic acid, dimer fatty acids, maleic anhydride, succinic anhydride, hexahydrophthalic anhydride, dimethylcyclohexane dicarboxylate, and so forth. The polyol can be neopentyl glycol (NPG), 1,4 butane diol, trimethylol propane, cyclohexane dimethanol, ethoxylated bisphenol A, glycerol, ethylene glycol, ester diol 204 ® (available from Union Carbide Corporation) and so forth.

Our preferred low molecular weight hydroxyl terminated polyesters are commercially available from King Industries under the trade name K Flex ®. Especially preferred low molecular weight hydroxyl terminated polyesters are K Flex 148 ® and K Flex 188 ®. The most preferred is K Flex 148 ®.

It is also possible and sometimes even preferable that the low molecular weight hydroxyl terminated polyester is used in conjunction with other additives. For instance it can be used in conjunction with other film build additives such as ethoxylated bisphenol A (available from Milliken Chemical Company as Synfac 8009 ®), ethoxylated nonyl phenol, polyethylene glycol (available from Union Carbide under the trade name PEG ®), alkylated styrenated phenols or any organic solvent. The use of alkylated styrenated phenols as film build additives is disclosed in a copending application entitled "Nonionic Surfactant As A Pigment Dispersant And Film Build Additive" which is filed concurrently with this application. The use of low molecular weight hydroxyl terminated polyester and alkoxylated styrenated phenol in conjunction with each other result in high film build, good adhesion, good chip resistance, and exceptional smoothness.

Curing catalysts such as tin catalysts are usually present in the composition. Examples are dibutyltin dilaurate and dibutyltin oxide. When used, they are typically present in amounts of about 0.05 to 2 percent by weight tin based on weight of total resin solids in the electrocoat bath.

The principal emulsions of the electrodepositable coating compositions of the present invention are in an aqueous medium. The average particle size diameter of the resinous phase is about 0.1 to 10 microns, preferably less than 5 microns. The concentration of the resinous products in the aqueous medium is, in general, not critical, but ordinarily the major portion of the aqueous dispersion is water. The aqueous dispersion usually contains from about 3 to 50 percent preferably 5 to 40 percent by weight resin solids. Aqueous resin concentrates which are to be further diluted with water, generally range from 10 to 30 percent by total weight solids.

Besides water, the aqueous medium may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene glycol. The amount of coalescing solvent is not unduly critical and is generally between about 0 to 15 percent by weight, preferably about 0.5 to 5 percent by weight based on total weight of the resin solids.

EXAMPLES

Example A

Backbone Resin

The following ingredients were charged into a suitable reaction vessel: 1394.8 parts Epon 828 ® (epoxy from Shell Chemical Company having an epoxy equivalent weight of 188); 527.2 parts Bisphenol A; 395.6 parts Tone 200 ® (from Union Carbide, hydroxy equivalent weight of 263.6); and 101.2 parts xylene. The charge is heated to 145° C. under a nitrogen blanket. 2.4 parts dimethyl benzyl amine was added and the mixture held at 160° C. for one hour. An additional 5.2 parts dimethyl benzyl amine was added and the mixture held at 147° C. until a 1170 epoxy equivalent weight was obtained. The mixture was cooled to 98° C. and 153.2 parts diketimine (reaction product of diethylene triamine and methyl isobutyl ketone; at 72.7% non-volatile) and 118.2 parts methylethanol amine were added. The mixture was held at 120° C. for one hour, then 698.5 parts methyl isobutyl ketone was added. The resin had a final non-volatile of 75%.

EXAMPLE B

Crosslinker

A blocked polyisocyanate was prepared by charging 522.0 parts Mondur TD 80 ® (from Mobay Chemical Company) into a suitable reaction vessel. 0.15 parts dibutyltin dilaurate was added under a nitrogen blanket. 390.0 parts 2-ethyl hexanol was added to the mixture while keeping the reaction flask below 60° C. 133.8 parts trimethylolpropane was added. The mixture was held at 120° C. for one hour until essentially all free isocyanate was consumed. 448.0 parts 2-ethoxyethanol (available from Union Carbide as ethylcellosolve ®) was added. The mixture has a 70.0% non-volatile.

EXAMPLE C

Crosslinker

A blocked polyisocyanate was prepared by charging 522.0 parts Mondur TD 80 ® (from Mobay Chemical Company) into a suitable reaction vessel. 0.15 parts dibutyltin dilaurate and 385.2 parts anhydrous methyl isobutyl ketone were added under a nitrogen blanket. 390.0 parts 2-ethyl hexanol was added to the mixture while keeping the reaction flask below 60° C. 133.8 parts trimethylolpropane was added. The mixture was held at 120° C. for one hour until essentially all free isocyanate was consumed. Then 63.0 parts butanol was added. The mixture had a 70.0% non-volatile.

EXAMPLE D

Crosslinker

A blocked polyisocyanate was prepared by charging 910.0 parts Isonate 181 ® (from Dow Chemical Co.); 0.15 parts dibutyltin dilaurate, and 527.5 parts anhydrous methyl isobutyl ketone into a suitable reaction vessel under a nitrogen blanket. 296.0 parts butanol was added while the temperature of the mixture was kept at 93° C. 162.0 parts Dowanol DB ® (from Dow Chemical Co.) was added. The mixture was kept at 100° C. for one hour until essentially all isocyanate was consumed. 58.6 parts butanol was added. The final non-volatile of the mixture was 70.0%.

EXAMPLE E

Quaternizing Agent

|  | Weight | Solids |
|---|---|---|
| 2-Ethyl Hexanol Half-Capped TDI in MIBK | 320.0 | 304.0 |
| Dimethyl Ethanolamine | 87.2 | 87.2 |
| Aqueous Lactic Acid Solution | 117.6 | 88.2 |
| 2-Butoxy Ethanol | 39.2 | — |
| Total | 564.0 | 479.4 |

| Pigment Grinding Vehicle | | |
|---|---|---|
|  | Weight | Solids |
| Epon 829 ® | 710.0 | 682.0 |
| Bisphenol A | 289.6 | 289.6 |
| 2-Ethyl Hexanol Half-Capped TDI in MIBK | 406.0 | 386.1 |
| Quaternizing Agent (from above) | 496.3 | 421.9 |
| Deionized Water | 71.2 | — |
| 2-Butoxyethanol | 1095.2 | — |
| Total | 3068.3 | 1779.6 |

The quaternizing agent was prepared by adding dimethyl ethanol amine to the 2-ethylhexanol half-capped toluene diisocyanate (TDI) in a suitable reaction vessel at room temperature. The mixture exothermed, and was stirred for one hour at 80° C. Lactic acid was then charged followed by the addition of 2-butoxy ethanol. The reaction mixture was stirred for about one hour at 65° C. to form the desired quaternizing agent.

To form the pigment grinding vehicle, Epon 829 ® (a diglycidyl ether of Bisphenol A from Shell Chemical Company), and Bisphenol A were charged under a nitrogen atmosphere to a suitable reaction vessel and heated to 150° C.–160° C. to initiate the exothermic reaction. The reaction mixture was permitted to exotherm for one hour at 150° C.–160° C. The reaction mixture was then cooled to 120° C., and the 2-ethyl hexanol half-capped toluene diisocyanate was added. The temperature of the reaction mixture was held at 110° C.–120° C. for one hour, followed by the addition of 2-butoxy ethanol. The reaction mixture was then cooled to 85° C., homogenized, and charged with water, followed by the addition of the quaternizing agent prepared above. The temperature of the reaction mixture was held at 80° C.-85° C., until an acid value of one was obtained. The reaction mixture has a solids content of 58%.

EXAMPLE F

Pigment Paste

|  | Weight |
| --- | --- |
| Dispersion Resin (from Example E) | 232.5 |
| Deionized Water | 475.5 |
| Titanium Dioxide | 299.4 |
| Aluminum Silicate | 62.0 |
| Lead Silicate | 25.0 |
| Carbon Black | 15.5 |
| Dibutyl Tin Oxide | 36.0 |
| Total | 1145.9 |

The above ingredients were mixed until homogenous in a suitable mixing container. They were then dispersed in a sand mill until a Hegman reading of seven or greater is obtained. The non-volatile of this material was 50.0%.

EXAMPLE G

|  | Weight |
| --- | --- |
| Dispersion Resin (from Example E) | 266.5 |
| Deionized Water | 445.2 |
| Titanium Dioxide | 280.2 |
| Aluminum Silicate | 54.7 |
| Carbon Black | 24.3 |
| Lead Chromate | 12.0 |
| Lead Silicate | 24.3 |
| Dibutyl Tin Oxide | 17.0 |
| Total | 1124.2 |

The above ingredients were mixed until homogeneous in a suitable mixing container. They were then dispersed in a sand mill until a Hegman reading of seven or greater was obtained. The nonvolatile of this material was 50.0%.

EXAMPLE H

Emulsion

|  | Weight | Solids |
| --- | --- | --- |
| Backbone Resin (from Example A) | 553.19 | 414.88 |
| Crosslinker (from Example B) | 319.15 | 223.41 |
| Hexylcellosolve ® | 38.30 | — |
| Surfactant* | 6.38 | — |
| Acetic acid | 11.52 | — |
| Deionized Water | 871.46 | — |
| Total | 1800.00 | 638.29 |

*Surfactant is a mixture of 120 parts Amine C ® from Ciba Geigy, 120 parts acetylenic alcohol, commercially available as Surfynol 104 ® from Air Products and Chemicals, Inc., 120 parts of 2-butoxy ethanol, 221 parts by weight of deionized water, and 19 parts glacial acetic acid.

Thoroughly mix the backbone resin from Example A, crosslinker from Example B, hexylcellosolve ®, acetic acid, and surfactant. Then the deionized water was added under agitation. This mixture was allowed to mix until a majority of the organic ketone had evaporated. The emulsion nonvolatile was adjusted to 35.5 % with the necessary amount of deionized water.

EXAMPLE I

Emulsion

|  | Weight | Solids |
| --- | --- | --- |
| Backbone Resin (from Example A) | 553.19 | 414.88 |
| Crosslinker (from Example D) | 319.15 | 223.41 |
| Hexylcellosolve ® | 38.30 | — |
| Surfactant* | 6.38 | — |
| Acetic acid | 11.52 | — |
| Deionized Water | 871.46 | — |
| Total | 1800.00 | 638.29 |

*Surfactant is a mixture of 120 parts Amine C ® from Ciba Geigy, 120 parts acetylenic alcohol, commercially available as Surfynol 104 ® from Air Products and Chemicals, Inc., 120 parts of 2-butoxy ethanol, 221 parts by weight of deionized water, and 19 parts glacial acetic acid.

Thoroughly mix the backbone resin from Example A, crosslinker from Example D, hexylcellosolve ®, acetic acid, and surfactant. Then the deionized water was added under agitation. This mixture was allowed to mix until a majority of the organic ketone had evaporated. The emulsion nonvolatile was adjusted to 35.5% with the necessary amount of deionized water.

EXAMPLE J

Emulsion

|  | Weight | Solids |
| --- | --- | --- |
| Backbone Resin (from Example A) | 454.0 | 340.5 |
| Crosslinker (from Example B) | 284.0 | 198.8 |
| K Flex 148 ® | 28.4 | 28.4 |
| Dowanol PPH ® (from Dow Chem. Co.) | 23.0 | — |
| Surfactant* | 6.0 | — |
| Acetic acid | 10.0 | — |
| Deionized Water | 794.6 | — |
| Total | 1600.0 | 567.7 |

*Surfactant is a mixture of 120 parts Amine C ® from Ciba Geigy, 120 parts acetylenic alcohol, commercially available as 'Surfynol 104 ®' from Air Products and Chemicals, Inc., 120 parts of 2-butoxy ethanol, 221 parts by weight of deionized water, and 19 parts glacial acetic acid.

In this example, the K Flex 148 ® was used as an additive to increase film build and improve film smoothness. The backbone resin from Example A, crosslinker from Example B, K Flex 148 ®, Dowanol PPH ®, acetic acid, and surfactant were thoroughly mixed. The deionized water was then added under agitation. This mixture was agitated until a majority of the organic ketone had evaporated. The emulsion nonvolatile was adjusted to 35.5% with the necessary amount of deionized water.

EXAMPLE K

Emulsion

|  | Weight | Solids |
| --- | --- | --- |
| Backbone Resin (from Example A) | 526.10 | 394.58 |
| Crosslinker (from Example C) | 303.54 | 212.48 |
| Hexyl cellosolve ® | 24.28 | — |
| Surfactant* | 6.07 | — |
| K Flex 188 ® | 31.95 | 31.95 |
| Acetic Acid | 14.28 | — |
| Dionized Water | 893.78 | — |
| Total | 1800.00 | 639.01 |

*Surfactant is a mixture of 120 parts Amine C ® from Ciba Geigy, 120 parts acetylenic alcohol, commercially available as Surfynol 104 ® from Air Products and Chemicals, Inc., 120 parts of 2-butoxy ethanol, 221 parts by weight of deionized water, and 19 parts glacial acetic acid.

Thoroughly mix the backbone resin from Example A, crosslinker from Example C, Hexyl cellosolve ®, acetic acid, surfactant, and K Flex 188 ®. Then add the deionized water under agitation. This mixture is allowed to mix until a majority of the organic solvent has evaporated. The emulsion nonvolatile was adjusted to 35.5% with necessary additional deionized water.

EXAMPLE L

Emulsion

|  | Weight | Solids |
|---|---|---|
| Backbone Resin (from Example A) | 730.69 | 548.03 |
| Crosslinker (from Example C) | 421.58 | 295.11 |
| Hexyl cellosolve ® | 33.72 | — |
| Tone 200 ® | 44.38 | 44.38 |
| Surfactant* | 8.43 | — |
| Acetic Acid | 19.83 | — |
| Deionized water | 1241.37 | |
| Total | 2500.00 | 887.52 |

*Surfactant is a mixture of 120 parts Amine C ® from Ciba Geigy, 120 parts acetylenic alcohol, commercially available as Surfynol 104 ® from Air Products and Chemicals, Inc., 120 parts of 2-butoxy ethanol, 221 parts by weight of deionized water, and 19 parts glacial acetic acid.

Thoroughly mix the backbone resin from Example A, crosslinker from Example C, Hexyl cellosolve ®, acetic acid, surfactant, and Tone 200 ®. Then add the deionized water under agitation. This mixture is allowed to mix until a majority of the organic ketone has evaporated. The emulsion nonvolatile was adjusted to 35.5% with necessary additional deionized water.

EXAMPLE 1

Electrocoat Bath

|  | Weight | Solids |
|---|---|---|
| Emulsion (from Example I) | 1304.0 | 463.0 |
| K Flex 148 ® | 24.0 | 24.0 |
| Deionized Water | 1626.0 | — |
| Pigment Paste (from Example F) | 346.0 | 173.0 |
| Total | 3300.0 | 660.0 |

This electrocoat bath was prepared by blending the above ingredients. The final bath non-volatile was 20.0%. The coating composition had a pH of 5.95 and a conductivity of 2005 microsiemens. Two zinc phosphate treated, cold-rolled steel panels were cathodically electrocoated at 83° F. for two minutes each. One was coated at 150 volts and the other at 200 volts. The wet films were cured at 360° F. for 17 minutes. The cured film thicknesses were 1.14 mils and 1.46 mils, respectively. The 1.14 mil panel had excellent smoothness; the 1.46 mil panel had good smoothness. Then two panels were coated at 175 volts (one was cured at 360° F. and one at 330° F.). They both had a cured film thickness of about 1.30 mils. They were subsequently spray coated with an acrylic enamel topcoat available from Du Pont as code number 662C61286. The topcoats were then cured at 265° F. for 17 minutes. The topcoats had a film build of 1.8 mils. These panels were chipped with 3 pints of gravel at room temperature per Society of Automotive Engineers Standard Procedure J-400, using a QGR gravelmeter from Q-Panel, Inc. of Cleveland, Ohio. The panels were analyzed for area chipped by a Joyce Loebl Magiscan ® image analyzer and a Nikon ® camera. The percentage of the area chipped for 330° F. and 360° F. cured system was 1.97% and 2.51% respectively.

EXAMPLE 2

Electrocoat Bath

|  | Weight | Solids |
|---|---|---|
| Emulsion (from Example I) | 1372.0 | 487.0 |
| Deionized Water | 1582.0 | — |
| Pigment Paste (from Example F) | 346.0 | 173.0 |
| Total | 3300.0 | 660.0 |

This electrocoat bath without K Flex 148 ® was prepared for comparison purposes by blending the above ingredients. The final bath non-volatile was 20.0%. The coating composition had a pH of 6.10 and a conductivity of 2130 microsiemens. Two zinc phosphate treated, cold-rolled steel panels were cathodically electrocoated at 83° F. for two minutes each. One was coated at 150 volts and the other at 200 volts. The wet films were cured at 360° F. for 17 minutes. The cured film thicknesses were 1.04 mils and 1.33 mils, respectively. Both panels had good film smoothness. Two more panels were then coated at 200 volts for two minutes each (one was baked at 360° F. and one was baked at 330° F. for 17 minutes). They both had a cured film thickness of about 1.30 mils. They were subsequently spray coated with an acrylic enamel topcoat available from DuPont under code number 662C61286. The topcoats were then cured at 265° F. for 17 minutes. The topcoats had a film build of 1.8 mils. These panels were chipped with 3 pints of gravel at room temperature per Society of Automotive Engineers Standard Procedure J-400, using a QGR gravelmeter from Q-Panel, Inc. of Cleveland, Ohio. The panels were analyzed for area chipped by a Joyce Loebl Magiscan ® image analyzer and a Nikon ® camera. The percentage of the area chipped for 330° F. and 360° F. cured system was 2.63% and 3.53% respectively.

A comparison of Example 1 with Example 2 shows that the electrocoat bath containing the K Flex 148 ® shows significantly higher film build and better chip resistance than the electrocoat bath without the K Flex 148 ® additive.

EXAMPLE 3

Electrocoat Bath

|  | Weight | Solids |
|---|---|---|
| Emulsion (from Example H) | 1304.0 | 463.0 |
| K Flex 148 ® | 24.0 | 24.0 |
| Deionized Water | 1626.0 | — |
| Pigment Paste (from Example G) | 346.0 | 173.0 |
| Total | 3300.0 | 660.0 |

The electrocoat bath was prepared by blending the above ingredients. The final bath non-volatile was 20.0%. The bath conductivity was 2030 microsiemens and pH was 6.04. A zinc phosphate treated, cold-rolled steel panel was cathodically electrocoated in an 83° F. bath at 220 volts for two minutes. The panel was cured at 360° F. for 17 minutes. The panel had a film thickness of 1.10 mils and very good film smoothness.

EXAMPLE 4

Electrocoat Bath

|  | Weight | Solids |
|---|---|---|
| Emulsion (from Example H) | 1372.0 | 487.0 |
| Deionized Water | 1582.0 | — |
| Pigment Paste (from Example G) | 346.0 | 173.0 |
| Total | 3300.0 | 660.0 |

An electrocoat bath without K Flex 148 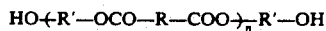 was prepared by blending the above ingredients. The bath conductivity was 1740 microsiemens, and pH was 6.15. A zinc phosphate pretreated, cold-rolled steel panels was cathodically electrocoated in an 83° F. bath at 250 volts for two minutes. The panel was cured at 360° for 17 minutes. The resulting panel had a film thickness of 0.80 mils, with very good smoothness.

A comparison of Example 3 and Example 4 shows that electrocoat baths containing K Flex 148 ® result in increased film thicknesses when compared to electrocoat systems without K Flex 148 ®.

EXAMPLE B

Electrocoat Bath

|  | Weight | Solids |
|---|---|---|
| Emulsion (from Example J) | 1623.0 | 576.0 |
| Deionized Water | 1929.0 | — |
| Pigment Paste (from Example G) | 448.0 | 224.0 |
| Total | 4000.0 | 800.0 |

The electrocoat bath was prepared by blending the above ingredients. The final bath non-volatile was 20.0%. The bath conductivity was 1780 microsiemens, and pH was 6.20. A zinc phosphate pretreated, cold-rolled steel panels was cathodically electrocoated in an 83° F. bath at 300 volts for two minutes. The panel was cured at 360° F. for 17 minutes. The panel cured film thickness was 0.76 mils, with very good film smoothness.

EXAMPLE 6

Electrocoat Bath

|  | Weight | Solids |
|---|---|---|
| Emulsion (from Example K) | 1622.50 | 576.00 |
| Deionized Water | 1929.50 | — |
| Pigment Paste (from Example G) | 448.00 | 224.00 |
| Total | 4000.0 | 800.00 |

The electrocoat bath was prepared by blending the above ingredients, the final non volatile was 20.0%. The electrocoat bath had a conductivity of 1858 microsiemens and a pH of 6.25. A zinc phosphate pretreated, cold rolled steel panel was cathodically electrocoated in the 83° F. bath at 225 volts for two minutes. The panel was cured at 360° F. for 17 minutes. The cured film thickness was 0.83 mils and had very good smoothness.

EXAMPLE 7

Electrocoat Bath

|  | Weight | Solids |
|---|---|---|
| Emulsion (from Example L) | 1622.50 | 576.00 |
| Deionized Water | 1929.50 | — |
| Pigment Paste (From Example G) | 448.00 | 224.00 |
| Total | 4000.00 | 800.00 |

The electrocoat bath was prepared by blending the above ingredients, the final non volatile was 20.0%. The electrocoat bath had a conductivity of 1552 microsiemens and a pH of 6.53. A zinc phosphate pretreated cold rolled steel panel was cathodically electrocoated in the 88° F. at 175 volts for two minutes. The panel was cured at 360° F. for 17 minutes. The cured film thickness was 0.77 mils and had very good smoothness.

We claim:

1. In an aqueous cathodic electrocoat bath composition comprising an epoxy/amine adduct, a blocked polyisocyanate crosslinker, a pigment paste, and an additive wherein the improvement comprises the use of about 0.1–15% by weight, based on resin solids of the composition, of an additive consisting essentially of a hydroxy terminated polyester having a molecular weight of 200 to 1000 and having the following formula:

$$HO\text{---}(R'\text{---}OCO\text{---}R\text{---}COO)_n\text{---}R'\text{---}OH$$

where R is alkylene, arylene or a mixture thereof; R' is alkylene, arylene or a mixture thereof; and n is a number from 1 to 6 and is the reaction product of dibasic acid and polyol.

2. The cathodic electrocoat bath of claim 1 wherein the dibasic acid is adipic acid, fumaric acid, phthalic anhydride, isophthalic acid, dimer fatty acids, maleic anhydride, succinic anhydride, or hexahydrophthalic anhydride.

3. The cathodic electrocoat bath of claim 2 wherein the polyol is neopentyl glycol, 1,4 butane diol, trimethylol propane, cyclohexane dimethanol, ethoxylated bisphenol A, glycerol, or ethylene glycol.

4. The cathodic electrodeposition bath of claim 1 wherein the hydroxy terminated polyester is used in conjunction with a separate film build additive.

5. The cathodic electrodeposition bath of claim 4 wherein the separate film build additive is an alkylated styrenated phenol.

6. In a method of preparing a cathodic electrocoatable bath comprising the following steps in any workable order:
(a) preparing an epoxy-amine adduct;
(b) blending the epoxy-amine adduct with a blocked polyisocyanate crosslinker;
(c) acid neutralizing the epoxy-amine adduct to form an emulsion;
(d) blending the emulsion with a pigment paste;
(e) adding a catalyst system to catalyze a reaction between the epoxy amine adduct and the blocked polyisocyanate crosslinker; and
(f) adding an additive to improve the electrocoatable bath characteristics; wherein the improvement comprises the use of about 0.1–15% by weight, based on resin solids of the bath, of an additive consisting essentially of a hydroxyl terminated polyester having a molecular weight of 200 to 1000 and having the following formula:

$$HO\text{---}(R'\text{---}OCO\text{---}R\text{---}COO)_n\text{---}R'\text{---}OH$$

wherein R is alkylene, arylene or a mixture thereof; R' is alkylene, arylene or a mixture thereof; and n is a number from 1 to 6 and is the reaction product of dibasic acid and polyol.

* * * * *